US010007931B2

(12) United States Patent
Bosarge et al.

(10) Patent No.: US 10,007,931 B2
(45) Date of Patent: Jun. 26, 2018

(54) METHOD OF ENHANCING EMAILS WITH TARGETED ADS

(71) Applicant: Consallus Group L.L.C., Wilmington, DE (US)

(72) Inventors: Jason Bosarge, Salt Lake City, CA (US); Roger Little, Salt Lake City, UT (US)

(73) Assignee: TAMIRAS PER PTE. LTD., LLC, Dover, DE (US)

( * ) Notice: Subject to any disclaimer, the term of this patent is extended or adjusted under 35 U.S.C. 154(b) by 388 days.

(21) Appl. No.: 14/180,102

(22) Filed: Feb. 13, 2014

(65) Prior Publication Data

US 2014/0229294 A1 Aug. 14, 2014

Related U.S. Application Data

(60) Continuation of application No. 12/174,920, filed on Jul. 17, 2008, now Pat. No. 8,655,731, which is a
(Continued)

(51) Int. Cl.
*G06Q 30/00* (2012.01)
*G06Q 30/02* (2012.01)

(52) U.S. Cl.
CPC ......... *G06Q 30/0273* (2013.01); *G06Q 30/02* (2013.01); *G06Q 30/0235* (2013.01);
(Continued)

(58) Field of Classification Search
CPC ............ G06Q 30/0273; G06Q 30/0241; G06Q 30/0235; G06Q 30/0251; G06Q 30/0254;
(Continued)

(56) References Cited

U.S. PATENT DOCUMENTS 5,724,521 A 3/1998 Dedrick
5,740,549 A 4/1998 Reilly et al.
(Continued)

FOREIGN PATENT DOCUMENTS

EP 0913779 5/1999
EP 1126392 8/2001
(Continued)

OTHER PUBLICATIONS

"About Gmail, More on Gmail and privacy", Published Google. com, http://mail.google.com/mail/help/more.html Jun. 15, 2004.
(Continued)

*Primary Examiner* — Raquel Alvarez
(74) *Attorney, Agent, or Firm* — Knobbe Martens Olson & Bear LLP

(57) ABSTRACT

A computer method and system for intercepting email messages, scanning the email messages for key words, determining whether the key words match or relate to key words determined to relate to advertising content, and enhancing the email message by routing the emails to recipients in a manner so that highly relevant, highly targeted advertising tag lines or other content are displayed together with the emails when the emails are accessed and viewed by email recipients.

16 Claims, 2 Drawing Sheets

Related U.S. Application Data division of application No. 10/234,564, filed on Sep. 4, 2002, now Pat. No. 7,599,852.

(60) Provisional application No. 60/370,478, filed on Apr. 5, 2002.

(52) U.S. Cl.
CPC ..... *G06Q 30/0251* (2013.01); *G06Q 30/0254* (2013.01); *G06Q 30/0255* (2013.01); *G06Q 30/0256* (2013.01); *G06Q 30/0267* (2013.01); *G06Q 30/0269* (2013.01); *G06Q 30/0271* (2013.01); *G06Q 30/0275* (2013.01); *G06Q 30/0277* (2013.01)

(58) Field of Classification Search
CPC ......... G06Q 30/02055; G06Q 30/0256; G06Q 30/0267; G06Q 30/0269; G06Q 30/0271; G06Q 30/0277; G06Q 30/02
USPC ........... 705/14.69, 14.4, 14.35, 14.49, 14.52, 705/14.53, 14.54, 14.67, 14.66, 14.71, 705/14.73
See application file for complete search history.

(56) References Cited

U.S. PATENT DOCUMENTS

| | | | |
|---|---|---|---|
| 5,754,938 | A | 5/1998 | Herz et al. |
| 5,794,050 | A | 8/1998 | Dahlgren et al. |
| 5,809,242 | A | 9/1998 | Shaw et al. |
| 5,815,830 | A | 9/1998 | Anthony |
| 5,838,790 | A | 11/1998 | McAuliffe et al. |
| 5,848,397 | A | 12/1998 | Marsh et al. |
| 5,848,407 | A | 12/1998 | Ishikawa et al. |
| 5,948,061 | A | 9/1999 | Merriman et al. |
| 6,014,502 | A | 1/2000 | Moraes |
| 6,014,688 | A | 1/2000 | Venkatraman et al. |
| 6,026,368 | A | 2/2000 | Brown et al. |
| 6,044,376 | A | 3/2000 | Kurtzman, II |
| 6,076,101 | A | 6/2000 | Kamakura et al. |
| 6,078,914 | A | 6/2000 | Redfern |
| 6,134,532 | A | 10/2000 | Lazarus et al. |
| 6,144,944 | A | 11/2000 | Kutzman, II et al. |
| 6,167,382 | A | 12/2000 | Sparks et al. |
| 6,269,361 | B1 | 7/2001 | Davis et al. |
| 6,308,202 | B1 | 10/2001 | Cohn et al. |
| 6,327,574 | B1 | 12/2001 | Kramer et al. |
| 6,356,898 | B2 | 3/2002 | Cohn et al. |
| 6,360,221 | B1 | 3/2002 | Gouch et al. |
| 6,366,298 | B1 | 4/2002 | Haitsuka et al. |
| 6,401,075 | B1 | 6/2002 | Mason et al. |
| 6,449,657 | B2 * | 9/2002 | Stanbach, Jr. ...... G06F 17/3089 705/14.54 |
| 6,516,321 | B1 | 2/2003 | De La Huerga |
| 6,516,341 | B1 | 2/2003 | Shaw et al. |
| 6,549,612 | B2 | 4/2003 | Gifford et al. |
| 6,563,514 | B1 | 5/2003 | Samar |
| 6,606,644 | B1 | 8/2003 | Ford et al. |
| 6,658,467 | B1 | 12/2003 | Rice et al. |
| 6,665,656 | B1 | 12/2003 | Carter |
| 6,665,838 | B1 | 12/2003 | Brown et al. |
| 6,681,223 | B1 | 1/2004 | Sundaresan |
| 6,766,302 | B2 | 7/2004 | Bach |
| 6,772,200 | B1 | 8/2004 | Bakshi et al. |
| 6,785,708 | B1 | 8/2004 | Busey et al. |
| 6,804,659 | B1 | 10/2004 | Graham et al. |
| 6,845,370 | B2 | 1/2005 | Burkey et al. |
| 6,892,181 | B1 | 5/2005 | Megiddo et al. |
| 6,985,882 | B1 | 1/2006 | Del Sesto |
| 7,007,074 | B2 | 2/2006 | Radwin |
| 7,013,298 | B1 | 3/2006 | De La Huerga |
| 7,035,901 | B1 | 4/2006 | Kumagai et al. |
| 7,039,599 | B2 | 5/2006 | Merriman |
| 7,136,875 | B2 | 11/2006 | Anderson et al. |
| 7,139,732 | B1 | 11/2006 | Desenberg |
| 7,188,137 | B2 | 3/2007 | Inoue et al. |
| 7,231,427 | B1 * | 6/2007 | Du ............ H04L 12/5855 709/206 |
| 7,328,242 | B1 | 2/2008 | McCarthy et al. |
| 7,599,852 | B2 | 10/2009 | Bosarge et al. |
| 7,752,074 | B2 | 7/2010 | Bosarge et al. |
| 7,974,874 | B2 | 7/2011 | Bosarge et al. |
| 8,041,604 | B1 | 10/2011 | Glaser |
| 8,346,608 | B2 | 1/2013 | Bosarge et al. |
| 8,655,731 | B2 | 2/2014 | Bosarge et al. |
| 9,690,786 | B2 * | 6/2017 | Berry .............. G06F 17/30038 |
| 2001/0016845 | A1 | 8/2001 | Tribbensee |
| 2001/0020231 | A1 | 9/2001 | Perri, III et al. |
| 2001/0025254 | A1 | 9/2001 | Park |
| 2001/0044741 | A1 | 11/2001 | Jacobs et al. |
| 2001/0044830 | A1 | 11/2001 | Takenaga |
| 2001/0047294 | A1 | 11/2001 | Rothschild |
| 2002/0019849 | A1 | 2/2002 | Tuvey et al. |
| 2002/0026360 | A1 | 2/2002 | McGregor et al. |
| 2002/0029250 | A1 | 3/2002 | Reiner |
| 2002/0083140 | A1 | 6/2002 | Shin et al. |
| 2002/0087631 | A1 | 7/2002 | Sharma |
| 2002/0091529 | A1 * | 7/2002 | Whitham ............ H04M 3/4938 704/275 |
| 2002/0091570 | A1 | 7/2002 | Sakagawa |
| 2002/0107882 | A1 * | 8/2002 | Gorelick ............... G06F 17/241 715/205 |
| 2002/0120505 | A1 * | 8/2002 | Henkin ................ G06Q 30/02 705/14.69 |
| 2002/0120874 | A1 * | 8/2002 | Shu ................ G06F 11/1076 726/26 |
| 2002/0123912 | A1 | 9/2002 | Subramanian |
| 2003/0046161 | A1 | 3/2003 | Kamangar et al. |
| 2003/0093315 | A1 | 5/2003 | Sato |
| 2004/0059632 | A1 | 3/2004 | Kang et al. |
| 2004/0059708 | A1 | 3/2004 | Dean et al. |
| 2004/0059712 | A1 | 3/2004 | Dean et al. |
| 2004/0068436 | A1 | 4/2004 | Boubek et al. |
| 2004/0073485 | A1 | 4/2004 | Liu et al. |
| 2007/0249709 | A1 | 10/2007 | Donovan et al. |

FOREIGN PATENT DOCUMENTS

| | | |
|---|---|---|
| EP | 1235396 | 8/2002 |
| GB | 2359640 | 8/2001 |
| GB | 2369218 | 5/2002 |
| JP | 11-045278 | 2/1999 |
| JP | 2001-318851 | 11/2001 |
| JP | 2002-108924 | 4/2002 |
| JP | 2002-109370 | 4/2002 |
| JP | 2002-117049 | 4/2002 |
| JP | 2002-245061 | 8/2002 |
| JP | 2002-259790 | 9/2002 |
| WO | WO 96-024213 | 8/1996 |
| WO | WO 97-021183 | 6/1997 |
| WO | WO 98-020410 | 5/1998 |
| WO | WO 99-063453 | 12/1999 |
| WO | WO 2000-044137 | 7/2000 |
| WO | WO 2000-055781 | 9/2000 |
| WO | WO 2001-044992 | 6/2001 |
| WO | WO 2001-050320 | 7/2001 |
| WO | WO 2001-86390 | 11/2001 |
| WO | WO 2002-007020 | 1/2002 |

OTHER PUBLICATIONS

Biag, E., "Targeted Ads Tied to Gmail's Super Space", USA Today, Apr. 15, 2004.
Dechert L.L.P, Intellectual Property: In the News, A Tale of Two Patents, Internetnews.com, http://www.dechert.com/practiceareas/practiceareas.jsp?pg=news_detail&nw_id=4234&cpa_id=28&nav=, May 19, 2004.
Festa, P., "Google to offer gigabyte of free e-mail", CNET News.com, http://news.com.com/2100-1032_3-5182805.html, Apr. 1, 2004.

(56) References Cited

OTHER PUBLICATIONS

Google Mail—it's easy and useful and the ads are unobstrusive, http://www.ernietheattorney.net/ernie_the_attorney/2004/05/google_mail_its.html, May 17, 2004.

Ignagius, A., "In Search of the Real Google", Time Magazine, Feb. 20, 2006.

Kuchinskas, S., "A Tale of Two Patents", Internetnews.com, http://internetnews.com/bus-news/article.php/3356391, May 19, 2004.

Mitchener, Brandon, "You're Not Going to Believe It, But Spam Isn't All Bad", p. 21 Nov. 1, 2001.

Nipper, S. "Google Gmail beaten to the punch?", The Invent Blog: Steven M. Nipper's Patent Blog, http://nip.blogs.com/patent/2004/05/google_gmail_be.html, May 20, 2004.

Untramatch Behavior Targeting, Infoseek, Whitepaper, pp. 1-5, 1997.

Zetter, K., "Free E-mail With a Steep Price?", Wired News, http://www.wired.com/news/business/0,1367,62917,00.html, Apr. 2, 2004.

Office Action dated Sep. 19, 2005 cited in related U.S. Appl. No. 10/234,564.

Office Action dated Feb. 13, 2006 cited in related U.S. Appl. No. 10/234,564.

Office Action dated Jun. 22, 2006 cited in related U.S. Appl. No. 10/234,564.

Office Action dated Sep. 25, 2006 cited in related U.S. Appl. No. 10/234,564.

Office Action dated Jun. 12, 2007 cited in related U.S. Appl. No. 10/234,564.

Office Action dated Apr. 2, 2008 cited in related U.S. Appl. No. 10/234,564.

Notice of Allowance dated Jul. 17, 2009 cited in related U.S. Appl. No. 10/234,564.

Non-Final Office Action dated Oct. 13, 2009 cited in related U.S. Appl. No. 12/047,846.

Notice of Allowance dated Mar. 26, 2010 cited in related U.S. Appl. No. 12/047,846.

Non-Final Office Action dated Sep. 28, 2010 in U.S. Appl. No. 12/778,809.

Notice of Allowance dated Jan. 27, 2011 in U.S. Appl. No. 12/778,809.

Non-Final Office Action dated Sep. 12, 2011 in U.S. Appl. No. 12/047,942.

Final Office Action dated Feb. 23, 2012 in U.S. Appl. No. 12/047,942.

Non-Final Office Action dated Apr. 23, 2012 in U.S. Appl. No. 12/047,942.

Notice of Allowance dated Aug. 23, 2012 in U.S. Appl. No. 12/047,942.

Non-Final Office Action dated Sep. 14, 2011 in U.S. Appl. No. 12/174,920.

Final Office Action dated Feb. 21, 2011 in U.S. Appl. No. 12/174,920.

Notice of Allowance dated Apr. 23, 2012 in U.S. Appl. No. 12/174,920.

Protest Under 37 CFR 1.291 (a), in U.S. Appl. No. 10/452,830, "Methods and apparatus for serving relevant advertisements", Apr. 26, 2004.

Non-Final Office Action dated Apr. 30, 2008 cited in related U.S. Appl. No. 10/452,830.

Final Office Action dated Nov. 24, 2008 cited in related U.S. Appl. No. 10/452,830.

Non-Final Office Action dated Jul. 15, 2009 cited in related U.S. Appl. No. 10/452,830.

Final Office Action dated Feb. 16, 2010 in related U.S. Appl. No. 10/452,830.

Non-Final Office Action dated Feb. 1, 2011 in related U.S. Appl. No. 10/452,830.

Final Office Action dated Feb. 23, 2012 in related U.S. Appl. No. 10/452,830.

* cited by examiner

METHOD OF ENHANCING EMAILS WITH TARGETED ADS

CROSS-REFERENCE TO RELATED APPLICATIONS

This application is continuation of U.S. patent application Ser. No. 12/174,920, filed Jul. 17, 2008, and entitled "Method of Enhancing Emails with Targeted Ads", which is a division of U.S. patent application Ser. No. 10/234,564, filed Sep. 4, 2002, now U.S. Pat. No. 7,599,852, and entitled "Method and Apparatus for Adding Advertising Tag Lines to Electronic Messages", which claims the benefit under 35 U.S.C. § 119 of U.S. Provisional Patent Application Ser. No. 60/370,478, filed Apr. 5, 2002, and entitled "Method and Apparatus for Adding Advertising Tag Lines to Electronic Messages". The disclosures of the foregoing applications are incorporated in their entirety.

BACKGROUND OF THE INVENTION

Field of the Invention

This invention pertains to business methods and apparatuses related to electronic messages or peer-to-peer communications (SMS messaging, Instant Messaging, email), message components of File Sharing applications (Napster, Kaaza, Morpheus, Knutella, etc.). In particular it pertains to a computer device intercepting sent electronic messages, scanning the message body content for key words, sending the key words to a remote central computer server which analyses the key words and enhances the message by attaching a relevant, contextual advertising tag line or image/banner/words/HTML/Flash, etc. to the electronic message, and transmitting the enhanced message to the receiver.

Description of the Related Art

A number of global network advertising systems are known which are used to sell advertising attached to global network messaging applications. In the early 1990's Hotmail (hotmail.com) pioneered the concept of intercepting personal electronic communications and appending third-party content in-side the message of the sender and intended for the recipient to see. Many other messaging systems also followed suit and began appending additional third-party content to personal electronic communications subscribing users. The appended third party content currently is and has usually been very general in nature or somewhat targeted based on dated advertising survey data of user preferences that may have been obtained during sign-up for the service. For example, the following companies attempt to append and/or combine third-party advertising content into electronic messages such as Hotmail, MSN (Microsoft Network), Yahoo!, Mailround, Junglemate, and more specifically Lycos Mail as part of the Terra Lycos Network. Terra Lycos is a global Internet company and leading provider of Internet access & content and provider of various Internet communication technologies. Terra Lycos has developed an electronic communications marketing system that appends various third-party advertisements, sweepstakes, etc. in emails that are transmitted by subscribers. In particular Lycos Mail is used to enhance personal email messages by appending hyperlinks (URL's), text advertisements and general HTML type content along side a sender's original message. This process gives the advertiser a trusted introduction and personal recommendation from the sender to the recipient and is intended to entice the recipient to view and/or click the third-party content.

Other products that are similar and common in the industry are policy and "disclaimer" company content that can be appended and/or prepended to all outgoing corporate email. One company in particular Red Earth Software provides such a product, as does Direct Communications Software Limited based in the United Kingdom. Their product eXclaimer allows companies to: "Add legal disclaimers, boilerplates and signatures to your emails. With this feature you can attach text and images to any incoming or outgoing email, above, below or even to the sides of the original email body. eXclaimer can be used simply to add standard legal disclaimer text to the footer of every outgoing mail, or it can be used to make professional-looking emails that conform to a particular style, with company logos and colors. eXclaimer includes the ability to use a number of variable fields from the Active Directory. These fields behave in much the same way as mail merge fields in a word processor. When used with these fields, the text that eXclaimer attaches can be highly personalized automatically. By integrating with the Active Directory, this feature can be customized for every individual, or for whole groups or departments." (www.exclaimer2000.com).

Reiner, U.S. Pat. No. 20020029250 issued Mar. 7, 2002 entitled "Method and apparatus for transmitting an electronic message on electronic letterhead" creates and distributes computer-enhanced artwork for use in electronic messaging. Reiner is primarily "a process for transforming artwork, for example a logo, into a computer-readable artwork which can be computer-enhanced, optimized and distributed to a client computer."

Tuvey et al., GB Patent No. 2369218 published Feb. 14, 2002 discloses a method of appending compatible graphic or text-based content into electronic messages after intercepting the message and analyzing the messaging system format. The methods employed specifically by Tuvey et al. are not message content specific but are rather general advertisements (with a focus on large intrusive banner ads) that are generated based on user preferences in very high-level general categories such as "books", "Internet" or "shopping". The current sign-up process of Tuvey et al. requires the subscriber to "Select a minimum of 6 interests" stating that "It helps us to make sure you only see the stamps you're really interested in!" This process clearly limits the Tuvey et al. system to a minimum of six general interest categories and more importantly Tuvey et al. makes no attempt to determine the focus of the actual message content or to derive keyword essence to deliver highly targeted, highly relevant, contextual third-party advertisements. The result is that, the Tuvey et al. system will not place third-party content (i.e., ads) that are message content specific and cannot deliver "on-the-fly" contextual content exactly when the advertiser and/or recipient needs it.

Tuvey et al. specifically states in patent No. GB2369218, "Adding information to an electronic communication or e-mail": "[0040] (a) Embed advertising material into emails; or to [0041] (b) Add reference information to emails—for example an organisation's mail server may be controlled to add information to incoming mails about the sender of the received email where this information was available from a resource to which the organisation has access, or alternatively information about a sender's particular area of expertise or information specifically targeted at the recipient or the organisation they work for may be added to an organisation's outgoing emails." (original spelling included).

Both of these patented methods and processes fail to deliver contextual, relevant, message specific, message related content exactly when the advertiser needs it to be seen and more importantly exactly when the recipient of the message needs to see the advertisement or other relevant third-party content as it relates to the topic of discussion (i.e., message body content) between the sender and receiving parties. The general enhancement claims made by the applicants are artwork, logos or general graphical banner ads that are wholly unrelated to any specific message content. Accordingly, there remains a need to provide a more efficient means for delivering relevant, contextual third-party content via personal electronic messages utilizing "Just-in-Time-Delivery" to put the content in front of the user when it's needed and when it's relevant to the immediate situation of the sender and receiver.

The current methods in use in the industry render the advertising unfocussed which results in lesser revenues from the sales of lower cost random advertising rates. There thus remains a need for a method adapting advertising directed to particular users of a global marketing network.

In summary, the methods described in the above patent applications and methods do not analyze the message content to append relevant advertising messages. Instead, they append intrusive, blatant, predetermined dated third party advertising to the message. Nor do these methods provide a means to alter, modify, enhance or change the actual content or words of the message body text (as written by the sender) in any way. These applications therefore fail to harness the true potential of personal electronic messaging as a means for a contextually intelligent delivery of third-party content. The current methods fail to tap into what is the essence of the communication, extract that essence, and relate to it. There thus remains a need to employ a process whereby one can deliver third-party advertising content based on an electronic messaging user's current interests as reflected in the message context itself to make the appended advertisements significantly more relevant to the current topic of conversation between the individuals doing the message exchanging. The method and apparatus described below provides such an invention.

SUMMARY OF THE INVENTION

The present invention is:
a. a process for enhancing personal, person-to-person electronic communication messages such as email, instant messaging, etc. between two or more individuals via a worldwide-interconnected network i.e., the Internet, etc., local area networks, wide-area networks, wireless networking, etc.
b. a process for directly affecting, altering, modifying and/or changing the sender's message body content.
c. a process for altering specific words in sender's message content to be "clickable" by the recipient via a hyperlink or URL usable on the Internet or other network.

Said messages will be enhanced, more intelligent, more intuitive, more informed after reaching the intended recipients. The present invention can deliver highly targeted, "on-the-fly" contextual third-party content to instant messaging messages, email, SMS and nearly any other type of messaging system typically involving two or more individuals.

It comprises a method and system for attaching and transmitting advertising tag lines to electronic email transmissions. Specifically, it comprises a service provider agreeing, using a computer network with a central server, to provide financial incentives to clients transmitting emails who consent to attach advertising tag lines to their email transmissions. The service provider is compensated for these services by charging and collecting from advertisers fees for attaching advertising tag lines to electronic emails. The service provider receives, using a computer network, client consents to attach advertising tag lines to their email transmissions through a global information network. After the consents are acquired, the service provider intercepts and scans consenting clients email transmissions (body content and subject) for key words and contextual essence by the computer networks' central server. Based on the key word and contextual analysis, the service provider attaches tag line advertisements by activating the central server to directly add tag lines relating to the key words of the intercepted email. The central server then transmits the tagged emails to the clients' intended recipient. The service provider then periodically compensates the participating client for each email transmission sent with a tag line attached.

In another variation of method and system for attaching and transmitting advertising tag lines to electronic email transmissions, the service provider may provide periodic financial compensation to recipients of emails with advertising tag lines. The method and system for attaching and transmitting advertising tag lines to electronic email transmissions may thus compensate either or both of the client and recipient with a portion of the funds paid by advertisers to priority list their services in advertising tag lines attached to emails. It is contemplated that advertisers will be listed in ascending priority tag line listings based on the amount paid by advertisers based on a bid system, which increases depending on hierarchy tag line listing in the electronic email.

In another preferred embodiment of the method and system for attaching and transmitting advertising tag lines to electronic email transmissions, the client is compensated for each email with a tag line sent by its recipient to a third party user. It is also possible for participating user's to receive multi-level compensation for each downline recipient of a transmitted email incorporating a tag line sent by each level of its recipients' third party senders.

Preferably, the method and system for attaching and transmitting advertising tag lines to electronic email transmissions utilizes a central server which does not retain the contents of the email after the tag line is attached to maintain message confidentiality. In actual operation the processes of the technology are thus completely transparent to the end users.

In one preferred embodiment of the invention, the interaction of the sender's personal message body content with third-party content (i.e., ads) display and ranking from the advertiser perspective works as follows:

1. Advertiser chooses to purchase ad inventory from the tag line service provider.
2. Advertiser logs on to the tag line service provider web site and chooses one or more keywords that are associated with their particular advertisement or content.
3. Advertiser selects a particular key word based on historical keyword data provided by tag line service provider. For example, the advertiser is shown the number of times in the past week various particular keywords may have been used in other message body content and then chooses a keyword such as "Travel".
4. Advertiser then makes a pay-per-click bid for use of the keyword such "Travel". This is the amount that the advertiser is willing to pay when a recipient clicks on their particular ad in the email ad listings.

5. Advertiser is then guaranteed that anytime an email is sent through the OpenMX Server with the word "Travel" in the message body or subject line of a participating user, their ad will be appended directly into the email body and become apart of the email message.
6. Advertiser is further assured that if the keyword "Travel" is found in the sender's personal message body text, the keyword will be dynamically altered into a clickable hyperlink that points directly to the advertiser's ad content on the Internet.
7. Advertiser contracts that to get the in-message text Hotlink, the advertiser has to have the top ranked or top bid ad out of all returned ad listings.

Preferably, the tag line advertisements are appended in a non-obtrusive manner to the body of the text of the electronic message, such as at the bottom or on the side of the message.

The advantages to the participants are numerous. For example, from the participating sender's perspective, the sender receives compensation for every tag line appended to the message body text. From the receiver's perspective, the receiver receives advertising tag lines of current interest to the subject to the message body text. In addition, the receiver may receive a portion of the compensation for the appended tag line. From the advertiser's perspective, the advertiser receives more focused advertisements directed to current topics of discussion between the sender and the receiver. The advertisement is carried by a trusted transmitter and therefore is not screened by scanning software. The advertiser also receives tiered advertising listings directly related to the size of its advertising budget. From the tag line service provider's perspective, the tag line service provider receives compensation for every appended tag line.

In another preferred embodiment, the tag line service provider, Sponster™ of Salt Lake City, Utah, has a Web driven server associated with an analysis software package known as "Contextus" to provide a processing engine as it relates to email is comprised of a PC with an Intel processor running Microsoft Windows NT Server software and IIS or Internet Information Server Web server software. IIS is configured with an Object based programming language called ASP/VBScript used to create the Sponster™ Web application. The Web application also uses HTML, JavaScript and other relevant Internet based languages. Subscribing users change their outgoing SMTP email setting to point to an OpenMX mail server (mail.openmx.com, etc.) and then all outbound email from that user will arrive at the OpenMX server where the processing occurs.

Once an email arrives at the server it is picked up by the Contextus processing engine that parses the email subject, body and all MIME parts. All necessary message and attachment decoding is done (Base64, Quoted Printable, Uuencoded, BINHEX, etc.). All header data; Date, Subject, From, Priority, Recipients, etc. are parsed through. All parts including text, HTML, XML and other body parts, every attachment, and all other MIME parts of the message are parsed.

The Contextus processing engine gives particular attention to the Subject and Body text of the message. Every word of the Subject and Body are parsed and analyzed and compared against key word and key phrase data from the Sponster Media advertiser/third-party content database.

The Sponster Web application makes a request to or communicates with the Structured Query Language (SQL) Ad Database via Active Data Objects (ADO) or via an HTTP request that calls an ASP script that uses ADO to communicate with the SQL database.

Once the ads are pulled from the SQL database they sent back to the OpenMX Server for the Contextus processing engine to continue the process of appending the ad listings to the email message text file. Once appended, the contextually enhanced message is then sent to its intended destination across the global information network. This is done using DNS and the SMTP protocol. Thus email sent to joe@somewhere.org will trigger a domain name search (DNS) lookup on somewhere.org. The lookup will be first for a mail exchanger (MX) record, then a normal address (A) lookup if this fails. MX records contain a preference value (to chose among multiple MX records for a particular domain), and the DNS name of the host receiving mail for the domain.

The modified email then arrives at its intended destination. Under optimal conditions the entire process should only take a few seconds.

The invention thus employs conventional global communication network components associated with Sponster™ software for using the same adapted to hook up via a modem, network card, Bluetooth interface or any other interface to any known data transmission networks such as terrestrial and wireless phone networks, optical data transmission networks, local area networks (LAN), wide area networks (WAN) and all other known and unknown transmission networks and mediums to access a central computer, which provides analysis and selection of an appropriate email tags for the intended recipient. It will communicate directly and autarkic (without means of a PC, Laptop, or personal organizer) directly with a local or remote server or computer, which handles and keeps track of all individual QueryStrings. This allows confidential access only by authorized screening devices to a large continually updated database.

The device is also capable of receiving the necessary advertising data directly from the database stored in the remote or local server. After the advertising database has been entered successfully, the Sponster™ activated transmission network (terrestrial or wireless phone network) automatically downloads and tags the email with an appropriate current advertisement or website. This data update connection could also be done by a dialup connection via a built-in or attached modem (analog, ISDN, etc.), via a connection to a local area network (LAN) or wide area network (WAN) or other techniques. The modem connection may include the use of mobile phones and the direct access to the Internet or intranet via interactive computer screens.

The method and apparatus thus provides a more focused advertising system where all parties are provided with compensation and current advertising information to provide services or products directly related to current topics of interest.

BRIEF DESCRIPTION OF THE DRAWINGS

FIG. 1b is an example of an enhanced text electronic message of FIG. 1a.

FIG. 1c is an example of a different enhanced text electronic message of FIG. 1a.

DETAILED DESCRIPTION OF THE PREFERRED EMBODIMENT

Figure 1A:
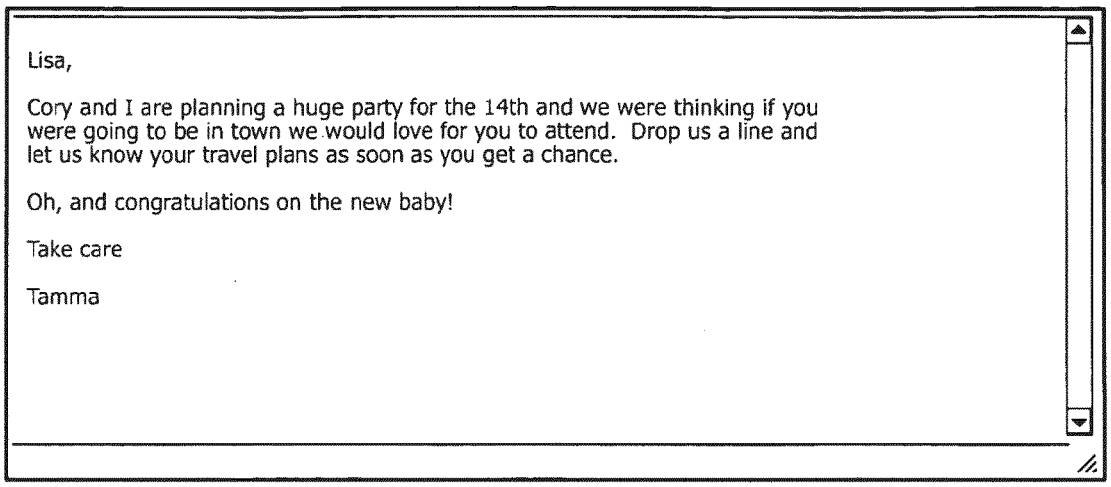
FIG. 1a is an example of a plain-text un-enhanced electronic message.

FIG. 1a is an example of a plain-text un-enhanced electronic message sent by an anonymous sender (who is also a tag line service provider member). The main elements of the plain-text of this personal email include:
1. Message body content.
2. Keywords that will trigger an OpenMX Server to append specific contextual third-party content, and
3. Empty, un-used white space to which tag line advertisements may be appended.

Figure 1B:
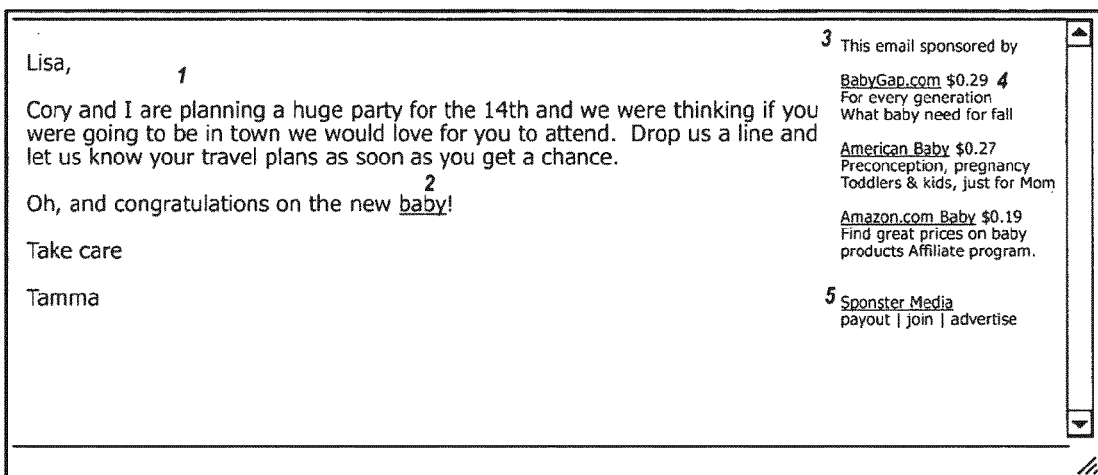

The sender sends the email to a friend that includes words in the message body text that will trigger specific third-party advertiser content when processed by the OpenMX Server. The sender's electronic message passes through the OpenMX Server equipped with processing software, such as that produced by Sponster™ of Salt Lake City, Utah. When processing starts the OpenMX Server retrieves all keywords for all third-party content (ads) stored in the ad database. The OpenMX Server anonymously parses sender's message body content and compares it against all ad keywords previously retrieved from the ad database. In this case OpenMX matched the words "Travel" and "Baby" from the message body content and appends the advertiser purchased keywords "Travel" and "Baby" from the ad database as shown in FIG. 1b. FIG. 1b illustrates a typical enhanced tag line personal message email. When keywords trigger paid third-party content (i.e., ads) the ads are ranked from top to bottom based on the payout amount to sender with the highest payout ad being ranked first or at the top of the ad listing. The main elements of the FIG. 1b enhanced personal email message are:
1. Message body content is directly affected.
2. Two different keywords triggered third-party content but only one keyword became an in-message Hotlink. That Hotlink directly corresponds to the highest bid ad in the ad listing. This is a competition amongst all ad listings returned or derived via specific keywords found in the personal message body text.
3. Dynamically appended listing of all sponsors that relate to keyword, un-used empty white space is now utilized.
4. Payout amount to sender and related affiliates if recipient clicks ad listing. Each ad listing has a separate payout amount listed and will trigger the payment amount specified when clicked. Also, the payout rules and amounts will apply if the recipient clicks the Hotlink within the message body.
5. Sponster Media specific links. Clicking "join" will automatically link the recipient to the sender in the Sponster Media affiliate program.

Figure 1C:
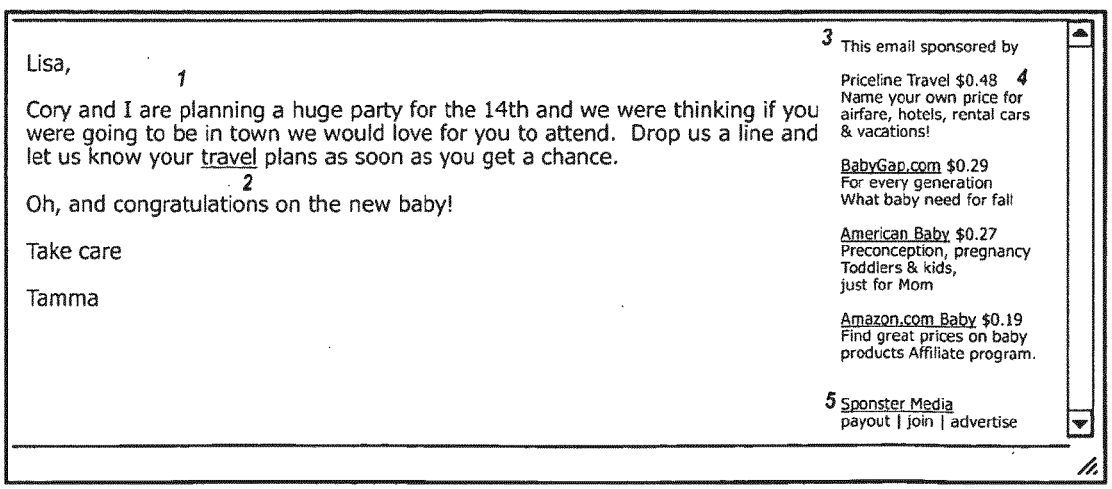

Specifically, OpenMX retrieved all ads related to Travel and Baby and then displayed all ads in the ad listing as part of the email body as shown in FIG. 1c. The sender's personal message body content is then further directly modified when the OpenMX Server dynamically changes the word "Travel" from the sender's personal message text into a clickable hyper linked URL. The word now has a subtle change in appearance, it is underlined, may change in color, and the mouse cursor changes when it hovers over the word. When and if the newly hyper linked word is clicked it will take the recipient to the site of the advertiser with the top listing in the ad results. It should be noted that even though matching two keywords from the body content, the OpenMX Server did not alter or hyperlink the word "Baby". This is because the advertiser purchase price for the keyword "Travel" has a higher click-through-payout than the advertisement purchase price for the keyword "Baby".

Comparing FIG. 1c to FIG. 1b, there is a different keyword in the message body content. Both keywords "baby" and "travel" triggered paid contextual content to be appended but only the highest bid ad got the Hotlink in the sender's personal message body text. Ad results were pulled for "travel" and "baby" and in this particular email Priceline Travel has the highest payout to sender (in the event of a click-through). Therefore Priceline gets the top spot in the ad listings and Priceline gets the "travel" Hotlink in the sender's message body. In FIG. 1b there were no "Travel" related advertisers with ad content in the system, therefore none were pulled by the OpenMX server. In that case the highest bid ad for the keyword "baby" got the Hotlink and the top spot in the ad listing.

This hierarchy listing process is a key aspect of the Sponster™ Media system and invention and was included to motivate third-party content providers to bid up for the highest spot in the advertising tag listings. No other listings get an in-message Hotlink except for the highest bidder in the advertising tag listing. Having a contextual Hotlink directly in the message body text is far superior to having just an ad appended in the returned ad listings where the desire is to generate direct click-throughs to the advertiser content.

Figure 2:
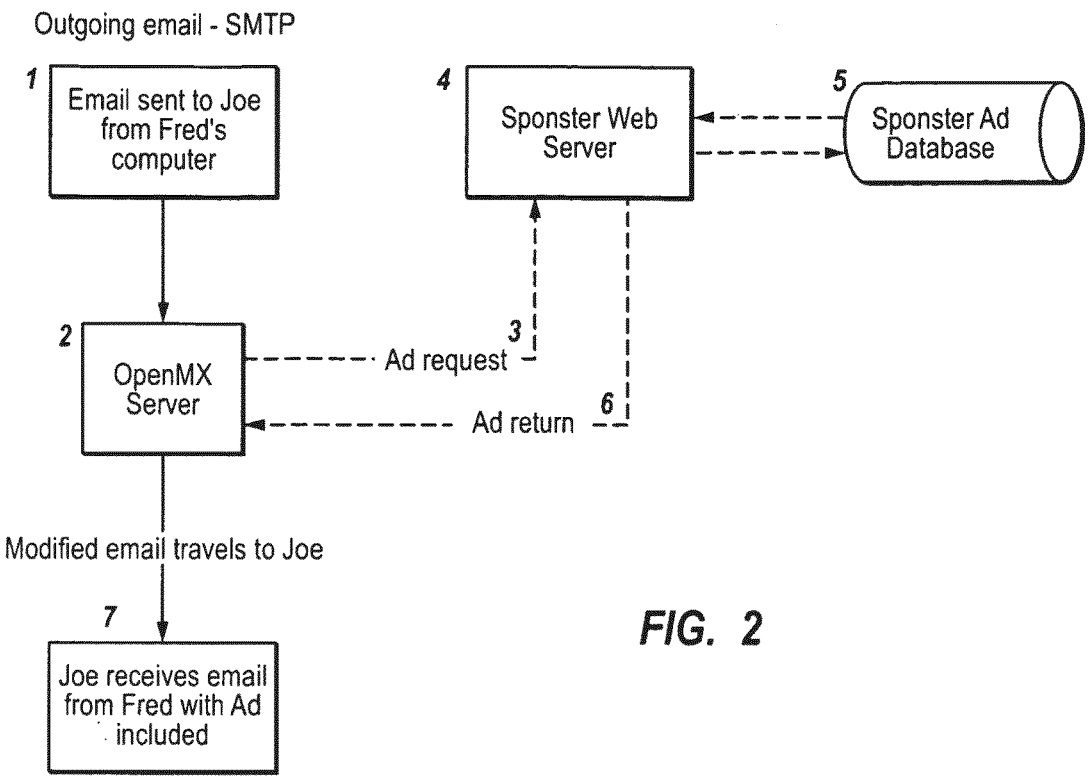
FIG. 2 is an example of a general network process flow of a typical network topology.

FIG. 2 illustrates a brief overview of a typical general network process flow for the OpenMX Technology employing the invention. It discloses a general network topology in common use on the Internet and corporate Intranets. In the illustration, email is sent from an affiliate computer. The affiliate's email client is configured so that all outgoing SMTP email is sent directly to the OpenMX Mail Server. The OpenMX Server then receives the email searches for key words, and after processing, parsing, etc., an intelligent ad request is made to the tag line service provider web server. The web server communicates with the database and relevant/Contextual ads are pulled and appended by the OpenMX processor. A direct MX lookup is then performed on the recipient domain to provide and transmit to the recipient an enhanced email.

Figure 3:
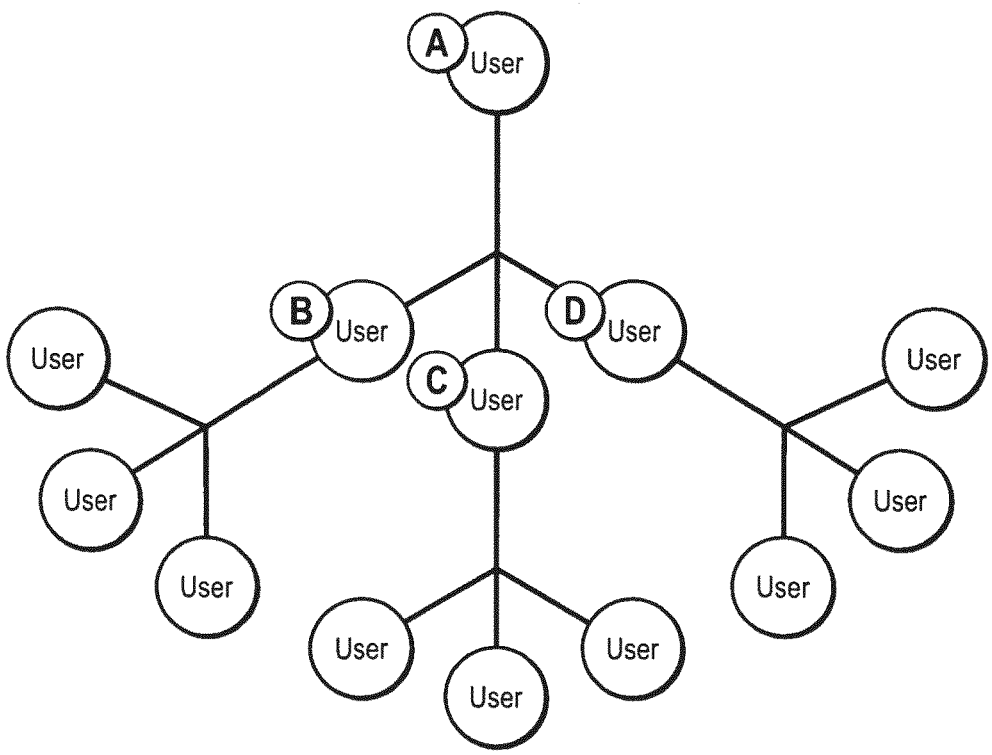
FIG. 3 is an example of an extended distribution channel network.

FIG. 3 illustrates the method of the invention employed in an extended distribution channel network The Sponster™ Media affiliate program is shown as a multi-tier program that allows all members to earn commissions on down line tagged messages, not just on their own personal emails. These commissions can be earned on tagged messages on a plurality of down line transmissions sent by other affiliates within their affiliate network. As affiliate users get more and more affiliates to join the system they get credit for the emails that pass through those distribution channels. This becomes an Extended Distribution Channel and can grow without limit as there are no restrictions on size or volume of tagged emails. For example, Affiliate A signs up with the Sponster™ Media system, and during the course of using the system gets users B, C and D to join also. User B sends about 8 emails per day through the OpenMX Servers. Any commissions paid to B via click-through events also trigger payments to User A. Likewise any commissions earned by User C will trigger payments to User A. Similarly, commissions earned by User D will trigger payments to User A.

The method and apparatus thus provides a cycle of benefits for all participants. Third party Dynamic Content Advertising Providers provide contextual and non-contextual commissionable and non-commissionable content for sender, enhancing message content. Message content can be directly acted upon via key word hyper linking or simply appended to via template wrapping. Content Advertising Providers compete for ad placement based on a key word bidding process in the case of multiple and similar contextual content placements. Sender's route outgoing messages through an OpenMX Server and by default their everyday communications provides a distribution channel that results in a trusted introduction and tacit approval for the Content Advertising Provider, presently blocked by various messaging software. The sender's distribution channel is usually comprised of but not limited to friends, family, acquaintances, co-workers, etc.

The post OpenMX Sender transmission output includes enhanced relevant content to receiver messages, which are non-intrusive to the content. The enhanced content was determined by analyzing the message content in an anonymous, non-personally identifying way for specific key words that have been deemed valuable by third party Content Advertising Providers. The key word content of the message is then contextually matched to the advertising tag lines. If there is no contextual related content from any Content Advertising Provider then a random content pull is done.

The receiver who may be unrelated to the tag line service provider but in most cases not unrelated to the sender, finds enhanced content relevant to the current email session, or discussion or for other varied reasons decides to view the added third-party content. The view event or "click-through" event results in a commission payment event where a portion of that commission is credited to the sender. The percentage payout amount is determined by the tag line service provider's variable depth compensation pro gram that is part of the tag line service provider's multi-tier affiliate program.

The Advertiser benefits from increased exposure, greater brand awareness, increased sales and other general and related benefits that result from a trusted recommendation or referral, which bypasses message-blocking (spam blocking) software. The receiver benefits with the unexpected addition of relevant, contextual tag line advertisements, to the message topic of email discussion.

The sender receives a portion of the advertising compensation for each down line tagged message recipient. The end result is that we have a system that can intelligently and contextually determine in-session, commissionable third-party content placement and ranking without ANY invasion of privacy in any way and it's non-intrusive.

Although this specification has referred to the illustrated embodiments, it is not intended to restrict the scope of the appended claims. The claims themselves contain those features deemed essential to the invention.

What is claimed is:

1. A method comprising:
    associating a keyword with an advertisement for insertion into electronic transmissions;
    receiving, at a messaging server from a client computing device, an electronic transmission including information identifying a sender of the electronic transmission and message body content;
    extracting, at the messaging server, the message body content from the electronic transmission;
    transmitting, from the messaging server to an advertisement selection server, an advertisement request, wherein the advertisement request includes at least a portion the message body content;
    selecting, at the advertisement selection server, information identifying the advertisement for insertion into the electronic transmission, said selecting based on a detection of the keyword within a portion of the message body content included in the advertisement request;
    transmitting, from the advertisement selection server to the messaging server, the information identifying the advertisement;
    upon receipt of the information identifying the advertisement, automatically generating and transmitting, from the messaging server, an enhanced electronic transmission to a recipient, wherein generating the enhanced electronic transmission comprises at least one of:
        altering the message body content from the electronic transmission to insert at least a portion of the information identifying the advertisement into an un-used portion of the message body content; and
        changing the keyword within the message body content of the enhanced electronic transmission into a hyperlink pointing to content on a network, wherein the hyperlink is generated at least in part on the information identifying the advertisement; and
    upon receiving information indicating an interaction with the advertisement or the hyperlink by the recipient of the enhanced electronic transmission, initiating a payment to a user of the client computing device.

2. The method of claim 1, further comprising associating the keyword with a second advertisement, wherein the enhanced electronic transmission further comprises the second advertisement inserted in a second un-used portion of the message body content.

3. The method of claim 2, further comprising:
    associating a first payment amount with the advertisement; and
    associating a second payment amount with the second advertisement, wherein the second payment amount is less than the first payment amount, and wherein the un-used portion of the message body content for the advertisement presents the advertisement before the second un-used portion of the message body content for the second advertisement.

4. The method of claim 1, further comprising:
    upon receiving information indicating the interaction with the advertisement by the recipient of the enhanced electronic transmission, initiating a second payment to the recipient.

5. The method of claim 1, further comprising:
    upon receiving information indicating a second interaction with the advertisement by a second recipient of the enhanced electronic transmission, initiating a second payment to the user, wherein the second recipient is not identified in the electronic transmission transmitted from the client computing device or ready for transmission from the client computing device.

6. The method of claim 5 further comprising:
    upon receiving the information indicating the second interaction with the advertisement by the second recipient of the enhanced electronic transmission, initiating a third payment to at least one of the recipient or the second recipient.

7. The method of claim 1, further comprising:
    anonymously parsing the message body content to detect the keyword.

8. The method of claim 1, wherein the portion of the message body content included in the advertising request does not include personally identifiable information of the sender or the recipient.

9. A system comprising:
a database storing an association between a keyword and an advertisement for insertion into electronic transmissions;
an advertisement server in data communication with the database and configured to:
  receive, from an electronic messaging server, a request for an advertisement to be inserted into an electronic transmission;
  select information identifying the advertisement for insertion into the electronic transmission, said selecting based on a detection of a keyword within at least a portion of the request; and
  transmit, to the electronic messaging server, the information identifying the advertisement;
the electronic messaging server configured to:
  receive the electronic transmission from a client computing device, the electronic transmission including information identifying a sender of the electronic transmission and message body content;
  extract, at the messaging server, the message body content from the electronic transmission;
  transmit the request including at least a portion of the message body content to the advertisement server;
  receive, from the advertisement server, the information identifying advertisement for insertion into the electronic transmission;
  upon receipt of the information identifying the advertisement, automatically generate and transmit an enhanced electronic transmission to a recipient, wherein generating the enhanced electronic transmission comprises:
    altering the message body content from the electronic transmission to insert at least a portion of the information identifying the advertisement into an un-used portion of the message body content; and
    changing the keyword within the message body content of the enhanced electronic transmission into a hyperlink pointing to content on a network, wherein the hyperlink is generated at least in part on the information identifying the advertisement; and
a networked server, configured to, upon receiving information indicating an interaction with the advertisement or the hyperlink by the recipient of the enhanced electronic transmission, initiate a payment to a user of the client computing device.

10. The system of claim 9, wherein the database stores a second association between the keyword and a second advertisement, wherein the electronic messaging server is further configured to receive the second advertisement for insertion into a second un-used portion of the message body content.

11. The system of claim 10, wherein the database further stores a first payment amount for the advertisement, and a second payment amount for the second advertisement, wherein the second payment amount is less than the first payment amount, and wherein the electronic messaging server receives the advertisement and the second advertisement ranked by payment amount and wherein the un-used portion of the message body content for the advertisement presents the advertisement before the second un-used portion of the message body content for the second advertisement.

12. The system of claim 9, wherein the networked server is further configured to, upon receiving information indicating the interaction with the advertisement by the recipient of the enhanced electronic transmission, initiating a second payment to the recipient.

13. The system of claim 9, wherein the networked server is further configured to, upon receiving information indicating a second interaction with the advertisement by a second recipient of the enhanced electronic transmission, initiating a second payment to the user, wherein the second recipient is not identified in the electronic transmission transmitted from the client computing device or ready for transmission from the client computing device.

14. The system of claim 13, wherein the networked server is further configured to, upon receiving the information indicating the second interaction with the advertisement by the second recipient of the enhanced electronic transmission, initiating a third payment to at least one of the recipient or the second recipient.

15. The system of claim 9, wherein the advertising server is configured to anonymously parse the message body content to detect the keyword.

16. A system comprising:
a data store storing specific computer-executable instructions; and
a computing device in communication with the data store, the computing device including a processor that executes the specific computer-executable instructions to cause the system to at least:
associate a keyword with an advertisement for insertion into electronic transmissions;
receive, at a messaging server from a client computing device, an electronic transmission including information identifying a sender of the electronic transmission and message body content;
extract, at the messaging server, the message body content from the electronic transmission;
transmit, from the messaging server to an advertisement selection server, an advertisement request, wherein the advertisement request includes at least a portion the message body content;
select, at the advertisement selection server, information identifying the advertisement for insertion into the electronic transmission, said selecting based on a detection of the keyword within a portion of the message body content included in the advertising request;
transmit, from the advertisement selection server to the messaging server, the information identifying the advertisement;
upon receipt of the information identifying the advertisement, automatically generate and transmit, from the messaging server, an enhanced electronic transmission, wherein generating the enhanced electronic transmission comprises at least one of:
  altering the message body content from the electronic transmission to insert at least a portion of the information identifying the advertisement into an un-used portion of the message body content; and
  changing the keyword within the message body content of the enhanced electronic transmission into a hyperlink pointing to content on a network, wherein the hyperlink is generated at least in part on the information identifying the advertisement; and
upon receiving information indicating an interaction with the advertisement or the hyperlink by a recipient of the enhanced electronic transmission, initiate a payment to a user of the client computing device.

* * * * *